US012480340B2

(12) United States Patent
Zhao

(10) Patent No.: US 12,480,340 B2
(45) Date of Patent: *Nov. 25, 2025

(54) LOCATOR FOR CABLE LOCK

(71) Applicant: Shenzhen Wins Electronic Technology Co., Ltd., Shenzhen (CN)

(72) Inventor: Shengfei Zhao, Shenzhen (CN)

(73) Assignee: Shenzhen Wins Electronic Technology Co., Ltd., Shenzhen (CN)

( * ) Notice: Subject to any disclaimer, the term of this patent is extended or adjusted under 35 U.S.C. 154(b) by 209 days.

This patent is subject to a terminal disclaimer.

(21) Appl. No.: 18/243,294

(22) Filed: Sep. 7, 2023

(65) Prior Publication Data

US 2024/0368924 A1 Nov. 7, 2024

(30) Foreign Application Priority Data

May 4, 2023 (CN) ........................ 202321040731.X

(51) Int. Cl.

*E05B 67/00* (2006.01)
*E05B 67/38* (2006.01)
*E05B 73/00* (2006.01)
*G08B 13/14* (2006.01)

(52) U.S. Cl.

CPC ............ *E05B 67/38* (2013.01); *E05B 67/003* (2013.01); *E05B 73/0005* (2013.01); *E05B 73/0029* (2013.01); *G08B 13/1463* (2013.01)

(58) Field of Classification Search

CPC ...... E05B 67/003; E05B 67/006; E05B 67/38; E05B 67/383; E05B 73/0005; E05B 73/0011; E05B 73/0029; E05B 73/0082; G08B 13/1463; G08B 13/2434

See application file for complete search history.

(56) References Cited

U.S. PATENT DOCUMENTS

| | | | | |
|---|---|---|---|---|
| 5,754,108 A * | 5/1998 | Ungarsohn | G08B 13/1463 340/687 |
| 6,888,241 B1 * | 5/2005 | Korn | G09F 3/0347 257/730 |
| 7,726,708 B2 * | 6/2010 | Bourrieres | E05B 39/00 292/307 R |
| 9,222,285 B1 * | 12/2015 | Ilislamloo | E05B 73/0005 |
| 9,640,051 B2 * | 5/2017 | Conaty | G08B 13/12 |
| 9,830,759 B2 * | 11/2017 | Hilton | E05B 73/0005 |
| 10,529,207 B1 * | 1/2020 | Yang | E05B 73/0029 |
| 11,773,626 B2 * | 10/2023 | Bullard | E05B 73/0005 70/51 |
| 2018/0190057 A1 * | 7/2018 | Heinz | E05B 67/003 |
| 2023/0258026 A1 * | 8/2023 | Bullard | E05B 73/0005 70/51 |

FOREIGN PATENT DOCUMENTS

CN 102923415 A 2/2013

* cited by examiner

*Primary Examiner* — Christopher J Boswell

(74) *Attorney, Agent, or Firm* — Birchwood IP

(57) ABSTRACT

A locator for a cable lock includes a lock body part and a locator, wherein the lock body part is a portion of the cable lock. There are beneficial effects due to the solution that the locator can be recycled and reused. A new disposable RFID component can be assembled with a recyclable locator with a relatively high cost from an unlocked cable lock, so as to form a new cable lock to maintain the locating function with increasing cost as less as possible.

14 Claims, 12 Drawing Sheets

LOCATOR FOR CABLE LOCK

CROSS-REFERENCE TO RELATED APPLICATIONS

This is a U. S. patent application which claims the priority and benefit of Chinese Patent Application Number 202321040731.X, filed on May 4, 2023, the disclosure of which is incorporated herein by reference in its entirety.

TECHNICAL FIELD

The present application relates to a cable lock, in particular to a cable lock with a locator.

BACKGROUND

Cable locks are mainly used for locking containers. At present, there exist two types of cable locks. With one type of the cable lock, one can check whether the metal cable had been cut only by naked eyes. With the other type of cable lock, one can check whether the cable lock had been unlocked by the uploaded data through Radio Frequency Identification (RFID) tags after the metal cable had been cut.

The above two types of cable locks products do not have real-time locating functions. The specific function of the electronic cable lock and its usage under specified scenes cannot be realized.

The inventor fails to find any commercially available products that can meet the above requirements. In addition, according to the inventor's search and analysis of the prior art, only some introductions of technologies with real-time locating and status-sending devices are found, such as the patent publication No. CN102923415A, entitled "Container door multi-frequency safety electronic label seal and monitor method thereof" filed by the applicant "Sheng Jun" on Nov. 12, 2012.

However, the patent publication is aimed at the multi-frequency security electronic signature seal of the door, which is mainly composed of a signature seal body and a U-shaped metal lock rod, and is not used in a cable lock, and the communication device of its Global Positioning System (GPS) module is integrally arranged on the electronic signature seal, thus the production and use cost is too high to be implemented as a specific product.

In the practical use scenario, each container needs a cable lock, so the demand for locks of such type in logistics and transportation is, which poses huge demand for cable locks. Therefore, it is important to realize the locating function in the locks without significantly increasing the cost in the industry, in view of the huge demand for the locks.

SUMMARY

In order to at least alleviate the related problems in the prior art, in a disclosure of the present application a locator for a cable lock is provided.

In an embodiment of the disclosure, the locator includes a lock body part and a locator, wherein the lock body part is a portion of the cable lock.

In an embodiment, the lock body part is provided with a detachable structure.

In an embodiment, the detachable docking structure is a T-shaped guide rail.

In an embodiment, the detachable docking structure is a T-shaped slider.

In an embodiment, an end of the T-shaped slider is provided with a position limit step.

In an embodiment, the lock body part is provided with an inner cavity, and the locator is arranged in the inner cavity of the lock body part.

In an embodiment, a battery is arranged within the inner cavity.

In an embodiment, the battery is electrically connected with the locator.

In an embodiment, the lock body part is provided with a connector thereon.

In an embodiment, the connector is electrically connected with the locator.

In an embodiment, the connector is a pogo pin or an electrically conductive plate corresponding to the pogo pin.

In an embodiment, the lock body part has a through hole through which the metal cable passes through.

In an embodiment, the lock body part is provided with a lock core thereon.

In an embodiment, the lock core is arranged in the through hole.

In an embodiment, the locator is any one or more of a GPS device, a Beidou positioning system device, or a Galileo positioning system device.

In an embodiment, the lock body part is provided with a detachable docking structure. The detachable docking structure is a T-shaped guide rail or a T-shaped slider. An end of the T-shaped slider is provided with a position limit step. The lock body part is provided with an inner cavity. The locator is arranged in the inner cavity of the lock body part. A battery is arranged within the inner cavity. The battery is electrically connected with the locator. A connector is arranged on the lock body part. The connector is electrically connected with the locator. The connector is a pogo pin, or an electrically conductive plate corresponding to the pogo pin. The lock body part has a through hole through which a metal cable passes through. The lock body part is provided with a lock core which is arranged within the through hole. The locator is any one or more of a GPS device, a Beidou positioning system device, or a Galileo positioning system device.

The disclosure has the following beneficial effects. The traditional integrated lock body is separated into two parts, one of which is a locator with a relatively high cost. In view of this, the disclosure provides a technical solution in which the locator is reused. As such after unlocking, a new disposable RFID component can be assembled with the recyclable locator with relatively high cost to form a new cable lock, and the locating function can be realized with use cost reduced as more as possible.

BRIEF DESCRIPTION OF DRAWINGS

In order to illustrate the technical solutions in the embodiments of the disclosure, the drawings related to the description of the embodiments will be briefly introduced below. It is apparent that, the drawings described below are only some embodiments of the disclosure. Those having ordinary skills in the art can derive other solutions according to these drawings without devoting creative effort.

DETAILED DESCRIPTION

Figure 1:
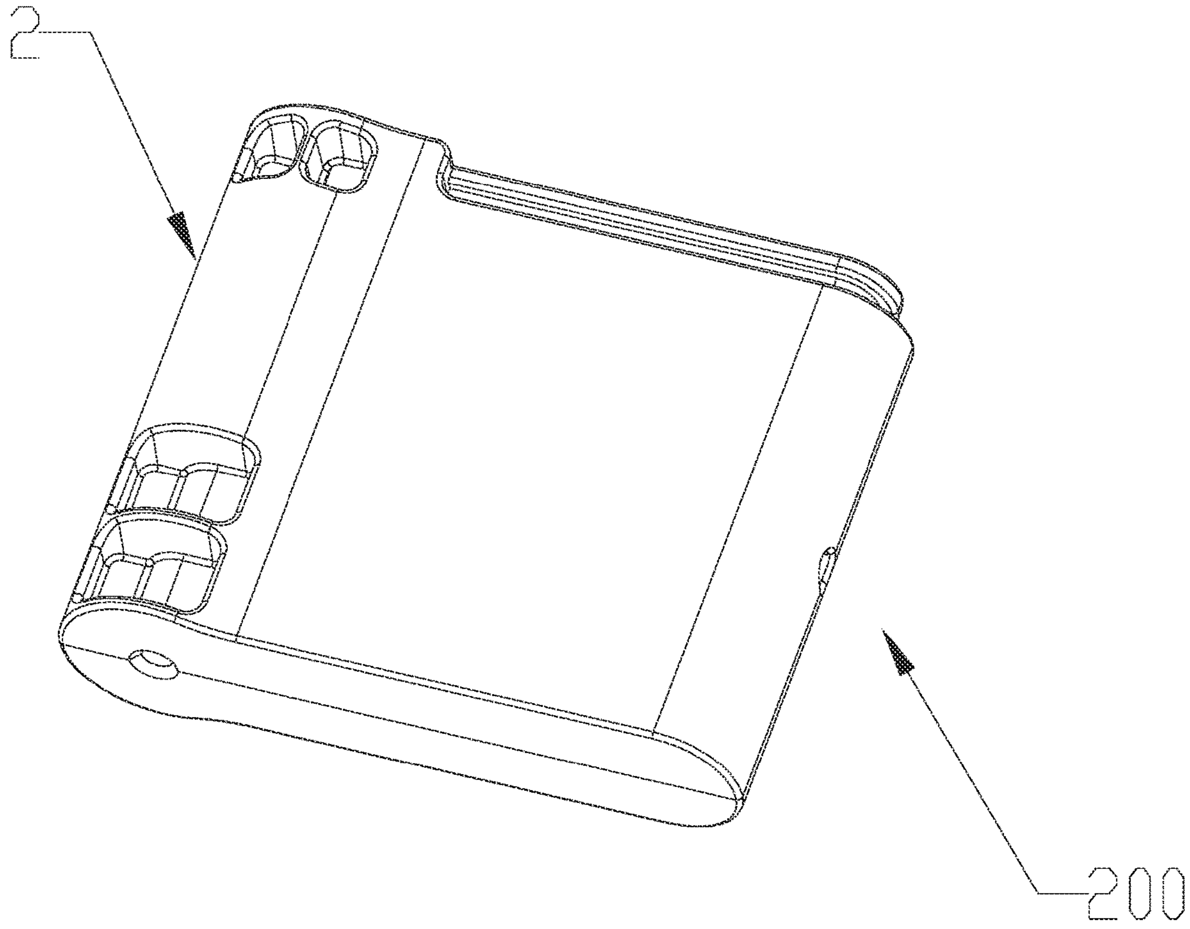
FIG. 1 depicts a schematic diagram showing a locator for a cable lock according to an embodiment of the disclosure.

It should be noted that the embodiments of the disclosure and the features in the embodiments may be freely combined with each other without conflict.

In the description of the disclosure, it should be understood that the terms "center", "longitudinal", "lateral", "up", "down", "front", "rear", "left", "right", "vertical", "horizontal", "top", "bottom", "inside", "outside", etc. indicate the orientation or position relationship based on the orientation or position relationship shown in the drawings, and are only for the convenience of describing the disclosure and simplifying the description, rather than indicating or implying that the device or component referred to must have a specific orientation, be constructed and operated in a specific orientation. And thus, those terms shall not be understood as a limitation on the scope of protection of the disclosure. In addition, the terms "first" and "second" are only illustrative, and it is not intended to be interpreted as indicating or implying relative importance or implicitly indicating the number of indicated technical features. Thus, the features defined as "first", "second" and so on may explicitly or implicitly include one or more of the features referred to.

In the description of the disclosure, unless otherwise specified, "plurality" means two or more. In the description of the disclosure, it should be noted that unless otherwise specified and limited, the terms "mount", "connected" and "connection" should be broadly understood. For example, the connection can be a fixed connection, a detachable connection, or an integrated connection. And the connection can be a direct connection, can also be an indirect connection through an intermediate media, and can be a connection inside two elements. The specific meanings of the above terms in the disclosure can be understood through specific situations, by those having ordinary skills in the art.

The disclosure will be further illustrated in conjunction with the attached drawings and specific embodiments.

Embodiment One

FIG. 1 depicts a reusable locator for a cable lock, which includes a recyclable part 200.

The recyclable part 200 includes a lock body part which is a portion of the cable lock and can be assembled with another part to form a complete lock body of the cable lock.

The lock body part is also called the second lock body 2. The second lock body 2 is provided with a locator 22 and a detachable structure.

The locator 22 is configured to provide real-time locating data.

The detachable structure adopts a detachable docking structure 4. The detachable docking structure 4 is a T-shaped slider that is arranged on top of the second lock body 2. When assembled with another part, the T-shaped slider 42 can form a raised boss structure distal to the water inlet gap, and has a waterproof effect.

The detachable docking structure 4 can also be a T-shaped guide rail.

An end of the T-shaped slider is provided with a position limit step for limiting when docking.

The second lock body 2 is provided with an inner cavity. The locator 22 is arranged within the inner cavity of the second lock body 2.

Due to the limited space, the battery is not arranged in the inner cavity in this embodiment. Instead, the battery is arranged on another part of the lock body for reasonable use of the space. However, the battery can also be arranged in the inner cavity if space is sufficient.

The position where the battery is arranged can be adjusted as desired. The battery may or may not be arranged within the inner cavity. It is apparent that the battery can be arranged in the other part of the lock body, instead of being arranged within this part of the lock body, as long as the power supply can be realized.

The battery is preferably a small button battery 14.

The second lock body 2 is provided with a connector that is electrically connected with the locator 22. If the battery is arranged on another part of the lock body, the electrical connection between the two can be realized through the connector, so as to supply power to the locator 22.

The connector is a pogo pin.

The second lock body 2 is provided with a through hole through which the metal cable passes.

Embodiment Two

In this embodiment, the reusable location and data transmission combination component are applied to the cable lock, and the cable lock assembled with the reusable position and data transmission combination component is illustrated based on embodiment one.

Figure 2:
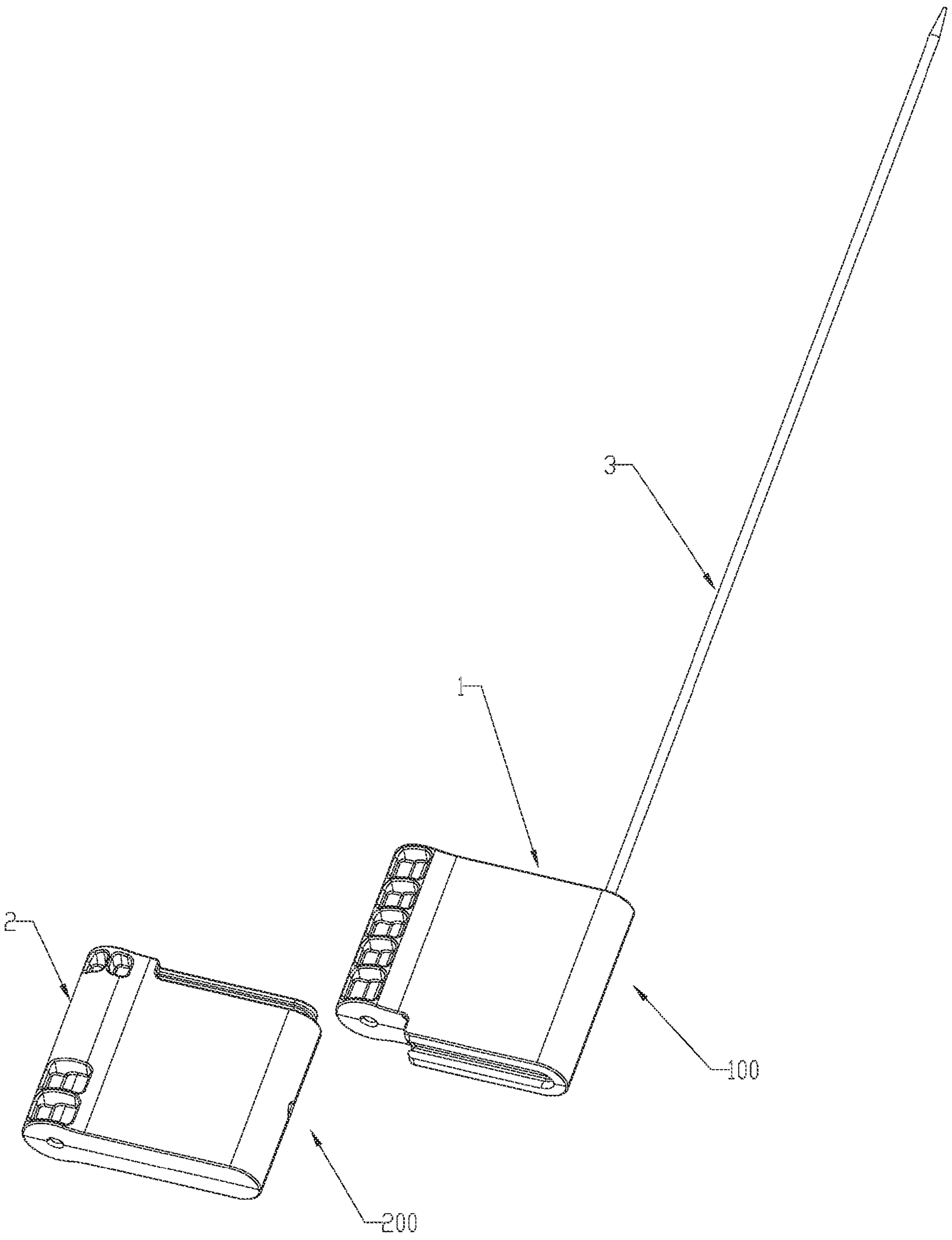
FIG. 2 depicts a schematic diagram showing the use of the disclosure.

As shown in FIG. 2, the cable lock with locator mainly includes two parts, i.e., a disposable part 100 which can be discarded after use, and a recyclable part 200 which can be reused.

The disposable part 100 includes a metal cable and a first lock body 1. The first lock body 1 preferably has a square upper housing 11.

The metal cable is preferably a steel cable 3. Alternatively, the metal cable may be a cable of another metal material.

The recyclable part 200 includes a second lock body 2. The second lock body 2 preferably has a square lower housing 21.

The first lock body 1 and the second lock body 2 respectively represent a portion of the lock body, where the term "first" and "second" are only intended to distinguish different parts of the lock body, and are not intended to imply an order.

The first lock body 1 and the second lock body 2 are assembled to form a complete lock body of a cable lock.

Figure 3:
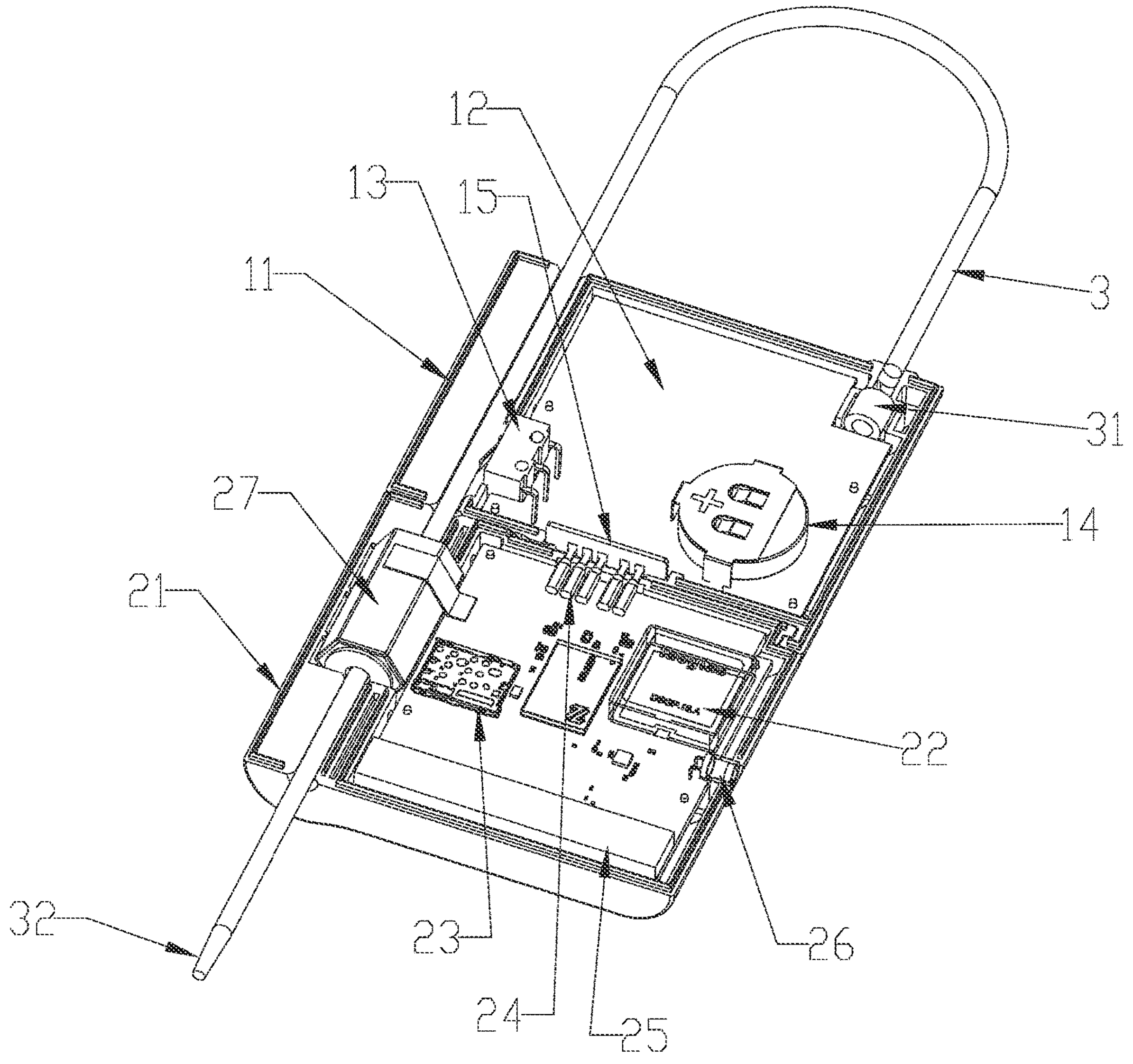
FIG. 3 depicts a schematic diagram showing the internal structure according to an embodiment of the disclosure.

As shown in FIG. 3, the first lock body 1 is provided with an RFID device 12. The second lock body 2 is provided with a locator 22. The first lock body 1 and the second lock body 2 can be integrated into one piece by a detachable structure to form a complete lock body of a cable lock.

The second lock body 2 is provided with a data transmitter 23 that is electrically connected with the locator 22. The real-time locating information of the locator 22 can be wirelessly transmitted to a remote terminal device through the data transmitter 23. For example, the locator 22 can transmit real-time locating information to a client or a background server through the data transmitter 23. The client can be a mobile phone or a handheld device of a user.

Figure 4:
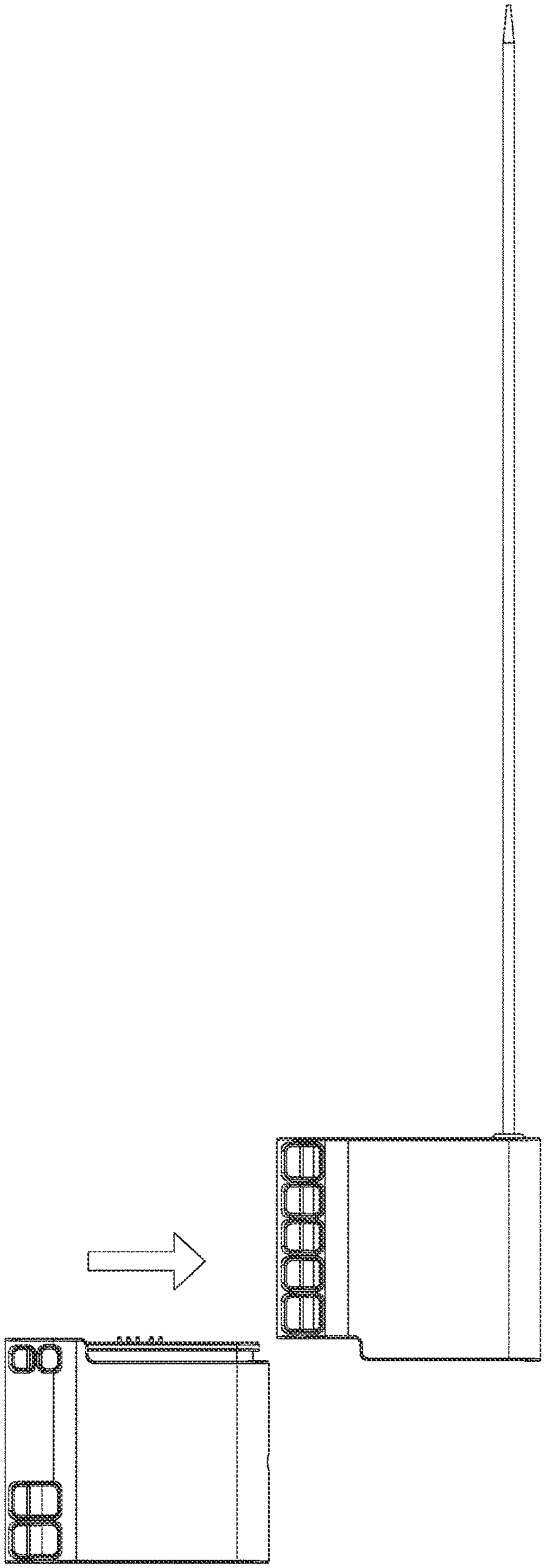
FIG. 4 depicts a schematic diagram showing the assembling process according to an embodiment of the disclosure.

As shown in FIG. 4, the first lock body 1 and the second lock body 2 can be connected through a detachable structure.

Figure 5:
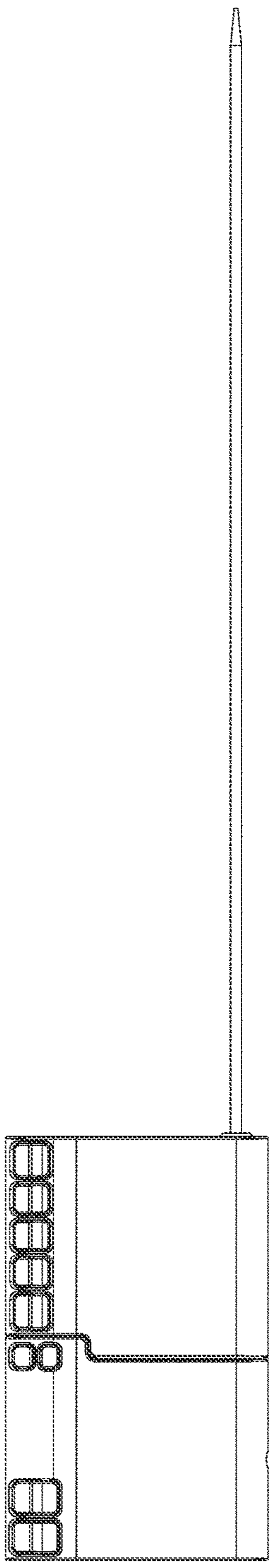
FIG. 5 depicts a schematic diagram showing the assembling process according to an embodiment of the disclosure.

As shown in FIG. 5, the first lock body 1 and the second lock body 2 are connected to form a cable lock that is in an unlocked state.

Figure 6:
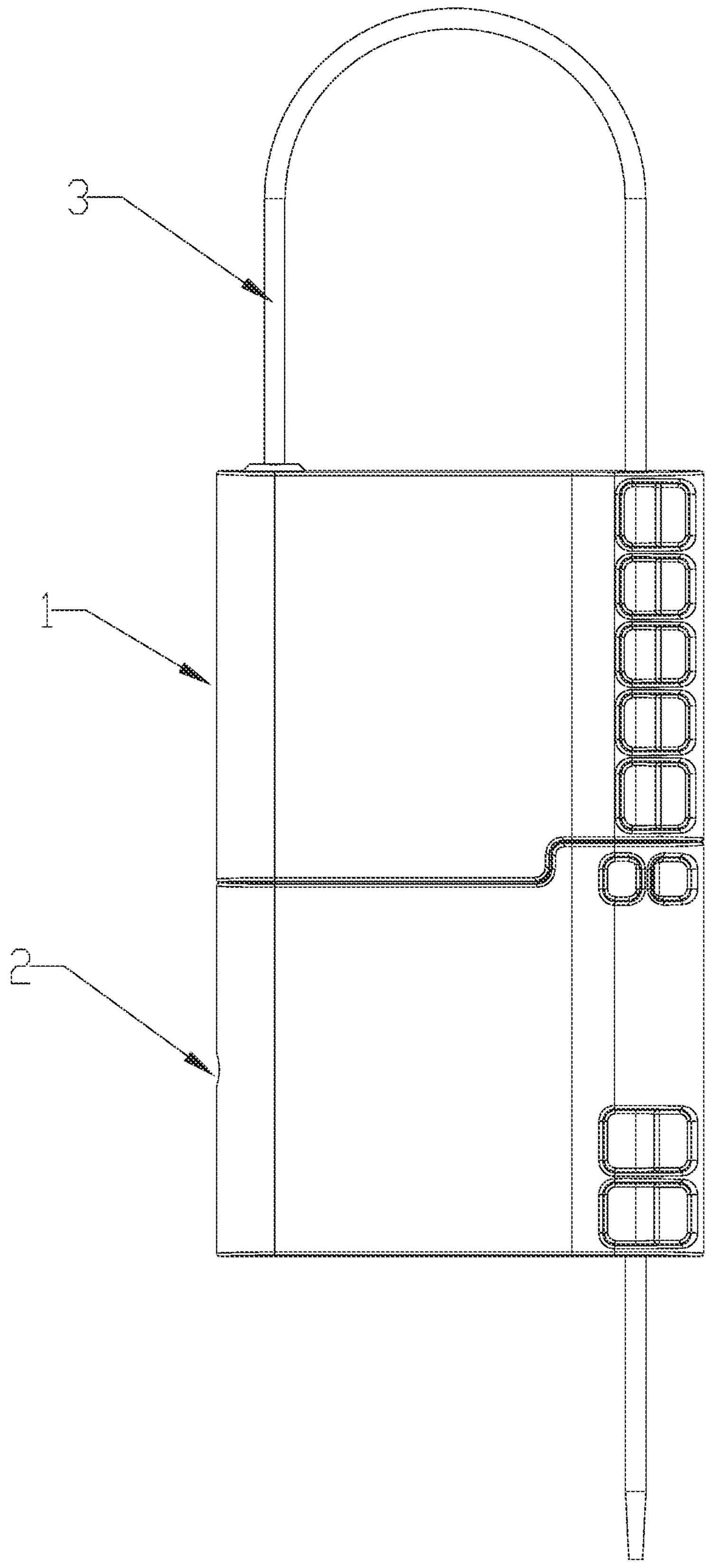
FIG. 6 depicts a schematic diagram showing the assembling process according to an embodiment of the disclosure.

As shown in FIG. 6, once the steel cable 3 passes through the first lock body 1 and then through the second lock body 2, the steel cable 3 can be locked thereby. Unlocking will not be possible unless steel cable 3 is cut off.

Once the steel cable 3 is cut off, the disposable part 100 is destroyed and can only be discarded. But the recyclable part 200 is not destroyed, and which can be assembled with a new disposable part 100 through a detachable structure to form a new cable lock such that the recyclable part 200 is recycled and reused. Thereby, the locating function of the cable lock is achieved while the cost is effectively controlled, such that the cost of the cable lock decreased, which is beneficial to the large-scale deployment of the locks.

The cable lock is locked on the container, such that the location information of the goods within the locked container is monitored in real-time.

Embodiment Three

In this embodiment, the transmission of electrical signals between the disposable part 100 and the recyclable part 200 of the cable lock is improved based on embodiment two.

As shown in FIG. 3, the RFID device 12 is electrically connected with the data transmitter 23, so that the information of the RFID device 12 can be transmitted through the data transmitter 23, and the status of the RFID device 12 can be known remotely.

The first lock body 1 is provided with a battery for supplying power to the RFID device 12, the locator 22 and the data transmitter 23. Since the first lock body 1 has more free space, mounting the battery in the first lock body 1 is more conducive to the rational use of space.

The battery is preferably a small button battery 14.

The battery can be a rechargeable battery or a non-rechargeable battery.

The first lock body 1 is provided with a first connector. The second lock body 2 is provided with a second connector. When the first lock body 1 and the second lock body 2 are integrated into one piece, the first connector is communicatively connected with the second connector, thereby realizing the transmission of electric signals between the disposable part 100 and the recyclable part 200.

The RFID device 12 is electrically connected with the first connector. The locator 22 and the data transmitter 23 are electrically connected with the second connector.

Figure 7:
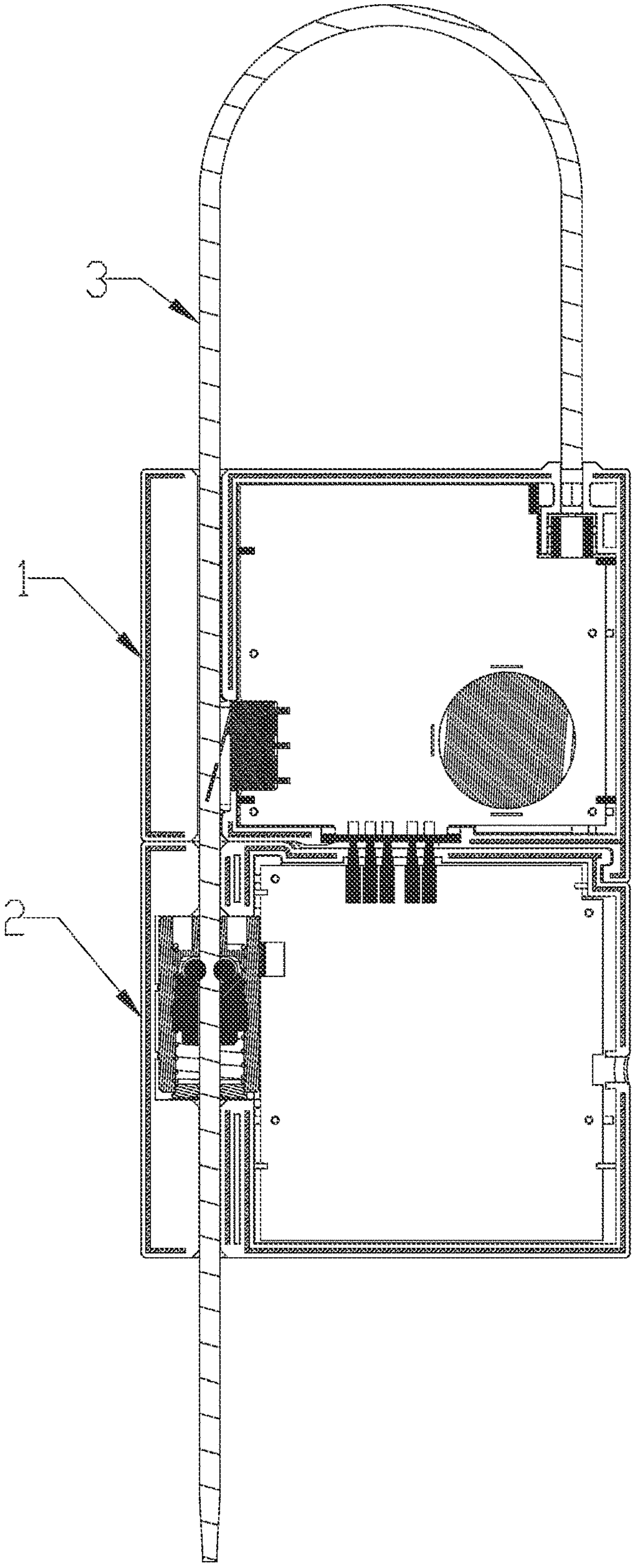
FIG. 7 depicts a schematic diagram showing the internal structure according to an embodiment of the disclosure.
Figure 8:
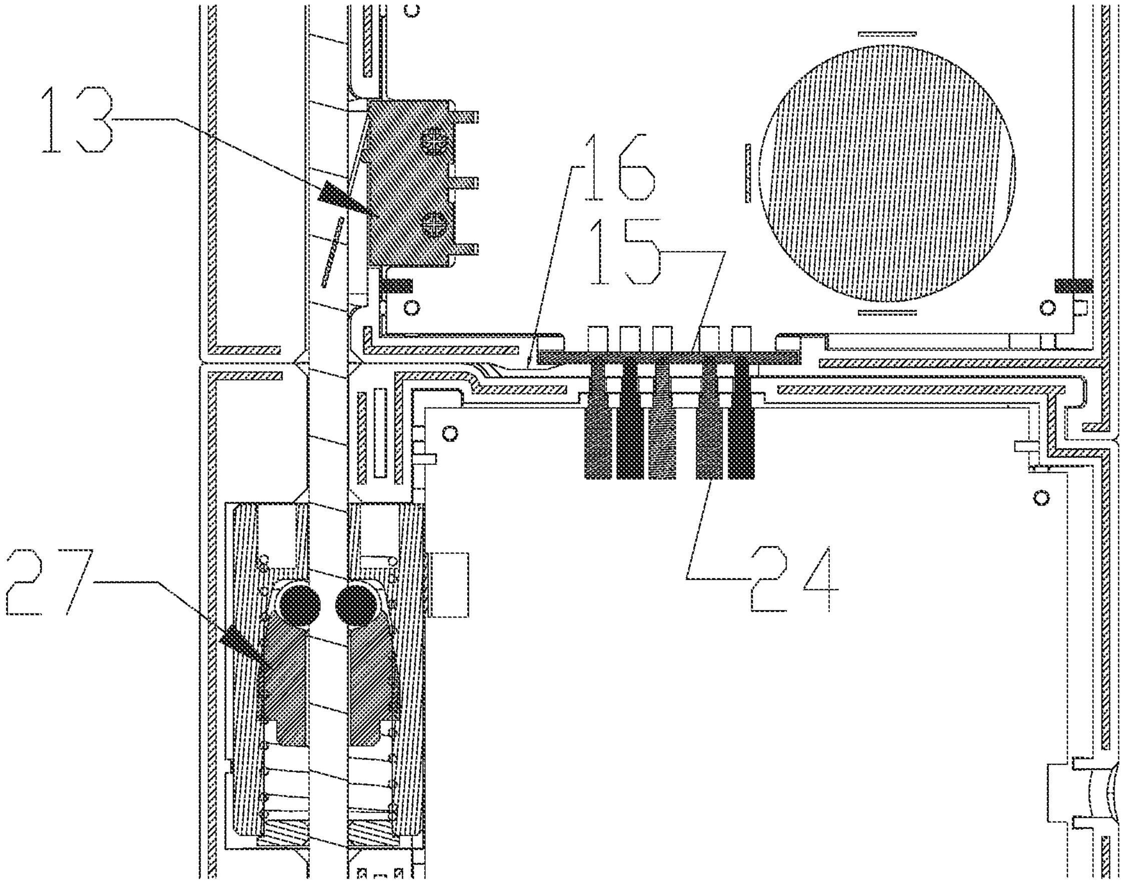
FIG. 8 depicts an enlarged schematic diagram showing an interior according to an embodiment of the disclosure.

As shown in FIGS. 7 and 8, the second connector is a pogo pin 24. The first connector is an electrically conductive sheet 15 which is in electrical connection and fits with the pogo pin 24. The first lock body 1 is provided with a guiding plate 16 which allows the pogo pin 24 to be released and compressed smoothly and flexibly. As the first lock body 1 and the second lock body 2 are connected through a detachable structure, the pogo pin 24 can slides in and electrically connected the electrically conductive sheet 15 with the help of the guiding plate 16. Thereby, the transmission of electrical signals between the disposable part 100 and the recyclable part 200 is achieved, and power supply and communication between the two devices can be achieved through the pogo pin.

The guiding plate 16 includes a guide-in slope for guiding the pogo pin 24 in and a guide-out slope for guiding the pogo pin 24 out.

The guiding plate 16 is preferably in the shape of an isosceles trapezoid.

The second lock body 2 is provided with an antenna 25 that is electrically connected with the data transmitter 23.

The second lock body 2 is provided with an indicator light 26 for state indication, such as the activation of the power supply.

Embodiment Four

In this embodiment, the arrangement of the power supply is modified based on embodiment three.

The position where the battery is mounted is adjusted from the first lock body 1 to the second lock body 2. In such an arrangement, the battery directly supplies power to the locator 22 and the data transmitter 23, and then supplies power to the RFID device 12 through the connector.

Embodiment Five

The position of the connector is modified based on embodiment three.

A pogo pin is mounted on the first lock body 1. And a contact connector is mounted on the second lock body 2.

Embodiment Six

In this embodiment, the locator 22 and the data transmitter 23 are selected on the basis of embodiment two.

The locator 22 can be a device of a Galileo positioning system, a GPS, a Beidou positioning system, or other positioning systems.

The data transmitter 23 may be a GSM device, a GPRS device or other wireless transmitters.

Embodiment Seven

In this embodiment, the detachable structure is illustrated in detail based on embodiment two.

Figure 9:
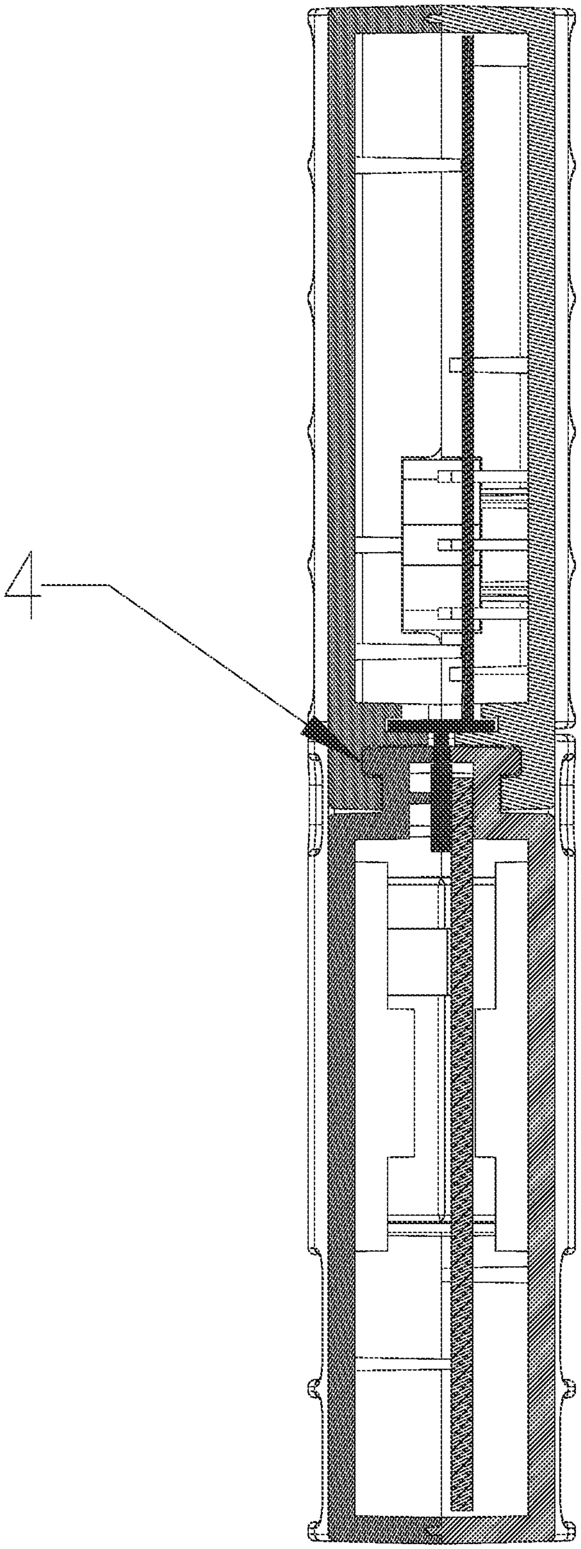
FIG. 9 depicts a schematic diagram showing the detachable docking structure according to an embodiment of the disclosure.
Figure 10:
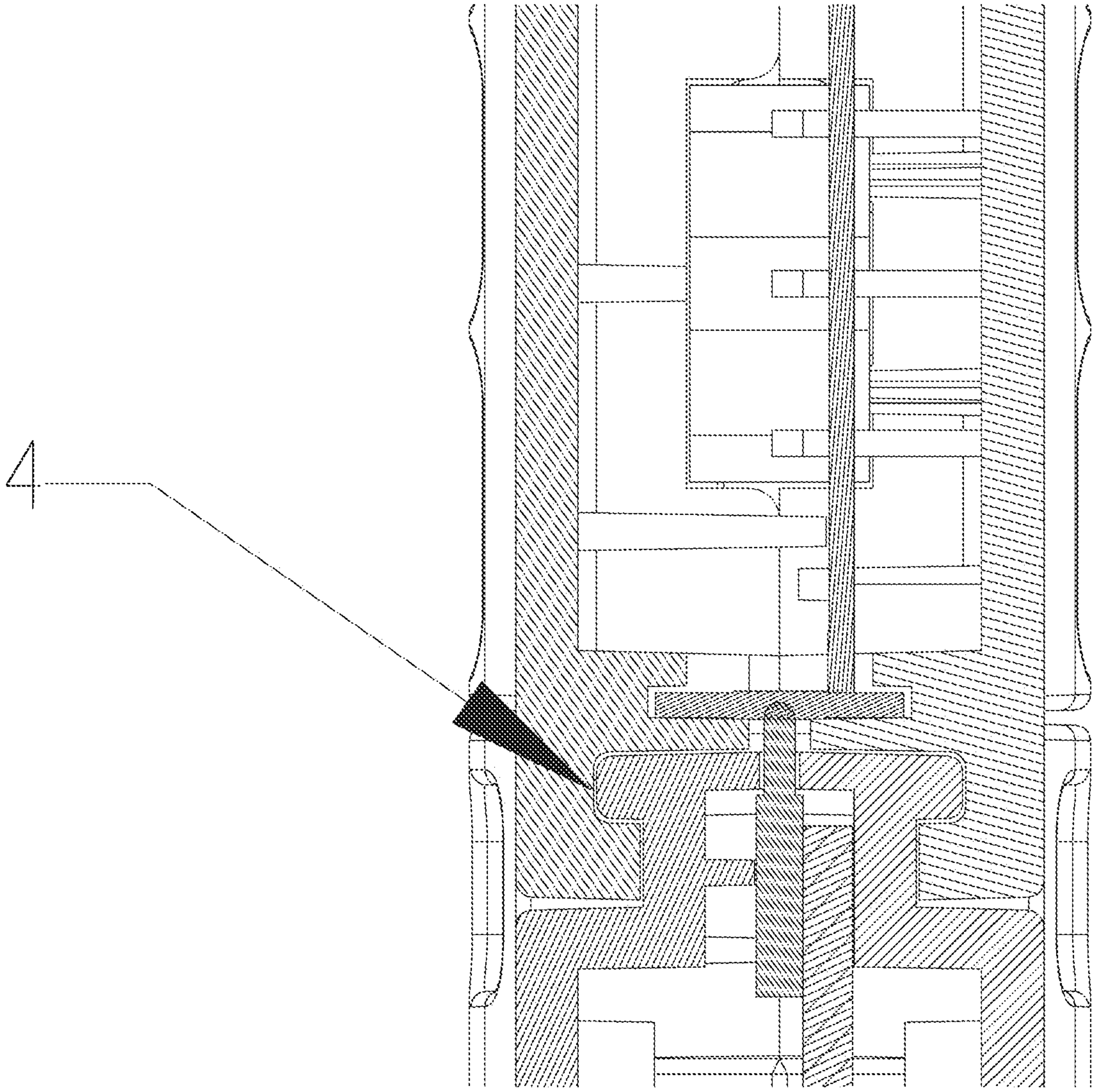
FIG. 10 depicts an enlarged schematic diagram showing the detachable docking structure according to an embodiment of the disclosure.

As shown in FIGS. 9 and 10, the detachable structure is a detachable docking structure 4 which can be matched with the steel cable 3 to form a stable upper and lower device.

Figure 11:
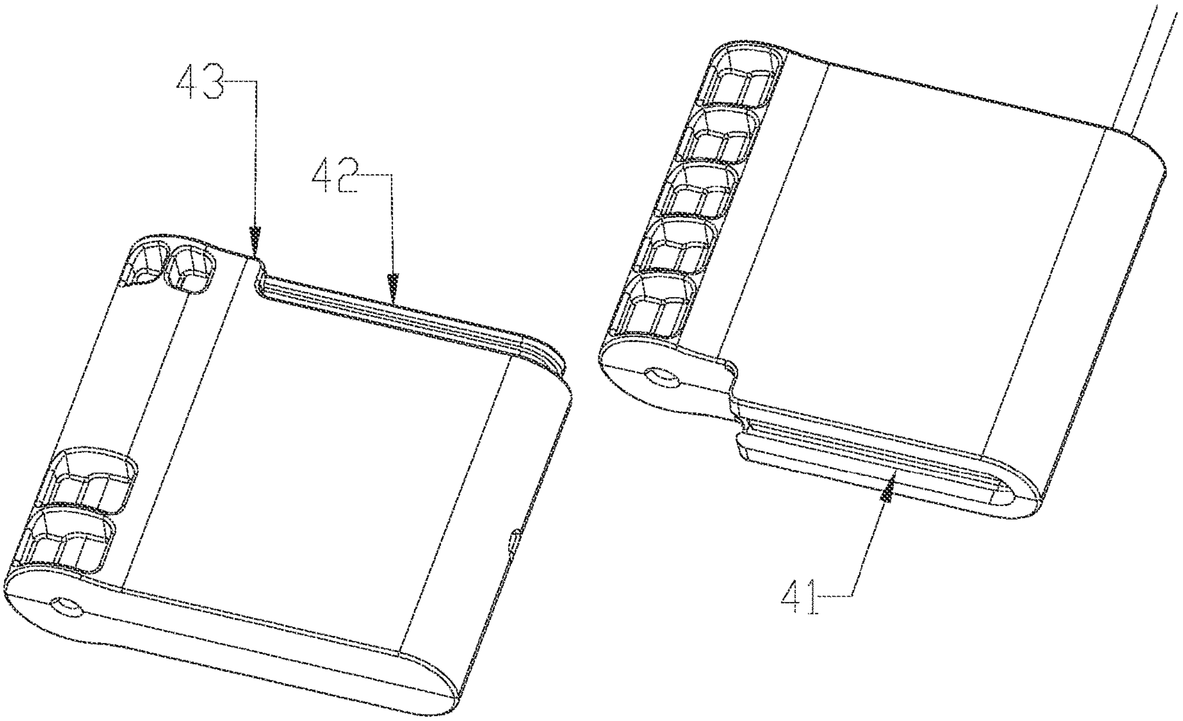
FIG. 11 depicts a schematic diagram showing the detachable docking structure according to an embodiment of the disclosure.
Figure 12:
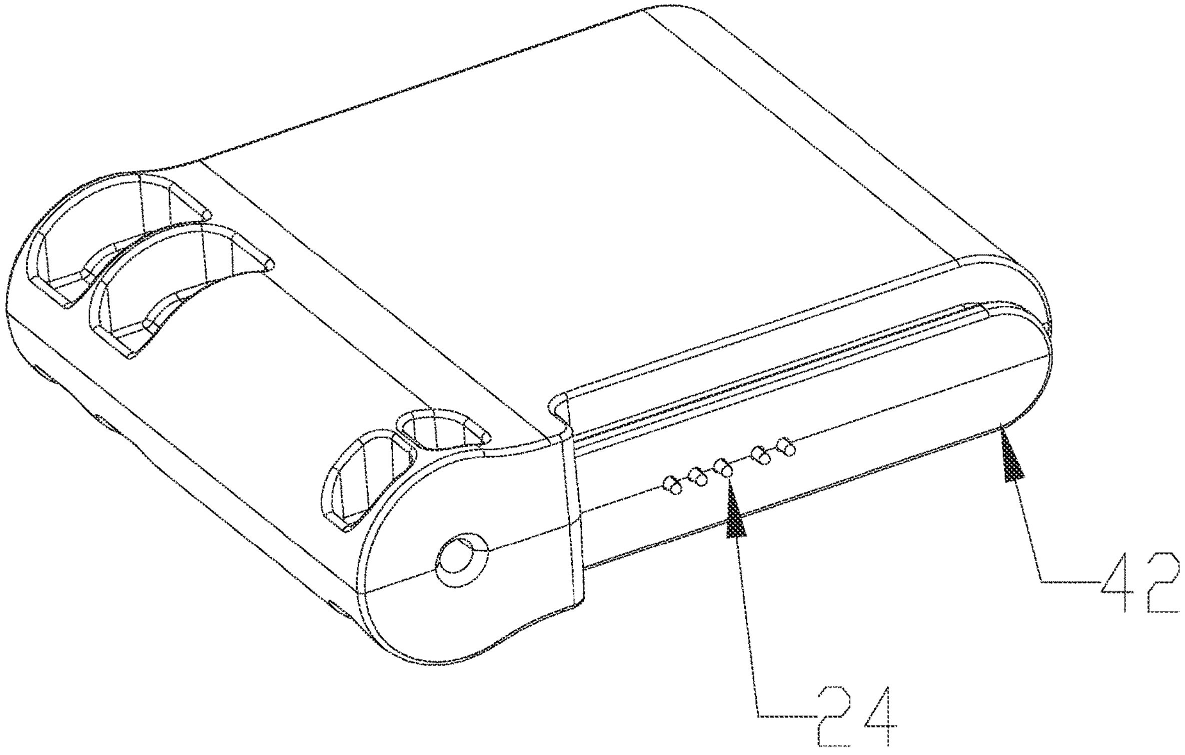
FIG. 12 depicts a schematic diagram showing a pogo pin according to an embodiment of the disclosure.

As shown in FIGS. 11 and 12, the detachable docking structure 4 includes a T-shaped guide rail 41, and a T-shaped slider 42 in sliding fits with the T-shaped guide rail 41.

The T-shaped guide rail 41 is arranged on the first lock body 1. The T-shaped slider 42 is arranged on the second lock body 2.

As shown in FIG. 12, the pogo pin 24 is mounted on the detachable docking structure 4. In particular, the pogo pin 24 can be mounted on the T-shaped slider 42, which can synchronously complete the docking of the connector when the lock body is docked.

As shown in FIG. 10, the T-shaped guide rail 41 is arranged above, the T-shaped slider 42 is arranged below, and the pogo pin 24 is mounted on the T-shaped slider 42, so that water can be prevented from entering the joint of the pin. That is, the T-shaped guide rail 41 acts as a waterproof wrap around the pogo pin 24, such that an enclosed space is thus formed. The pogo pin 24 is raised above the water inlet by the T-shaped slider 42. That is, the pogo pin 24 is mounted on a raised platform which is higher than the butt joint of the T-shaped guide rail 41 and the T-shaped slider 42. As such, when water flows from top to bottom, the water can enter the butt joint of the T-shaped guide rail 41 and the T-shaped slider 42 at most, but the water would not enter the space where the pogo pin 24 is located. Thereby, the rain-proof requirements of products are met.

The pogo pin 24 may also be mounted on the T-shaped guide rail 41.

As shown in FIG. 11, a position limit step 43 is provided at an end of the T-shaped slider 42 to limit the position where the first lock body 1 and the second lock body 2 are docked in position.

Embodiment Eight

In this embodiment, the positions of the T-shaped guide rail and the T-shaped slider are exchanged on the basis of embodiment seven. Therefore, the T-shaped slider is arranged on the first lock body 1 and the T-shaped guide rail is arranged on the second lock body 2.

Embodiment Nine

The detachable structure is modified on the basis of embodiment seven.

The guide rail of an alternative shape can be employed to cooperate with the slider to form a detachable structure.

A buckle structure can be employed to form a detachable structure. In an example, a structure of a male buckle mated with a female buckle is employed.

Alternatively, fasteners can be employed to form a detachable structure, such as mated screws and threaded holes, or mated screws and nuts.

Embodiment Ten

In this embodiment, the arrangement of the first lock body 1 and the second lock body 2 is further illustrated on the basis of embodiment two.

As shown in FIG. 4, the first lock body 1 and the second lock body 2 can be arranged in an up-and-down fashion. That is, the first lock body 1 is the upper lock body and the second lock body 2 is the lower lock body.

Alternatively, the first lock body and the second lock body can also be arranged in a left and right fashion.

The docking of the two locking bodies can be made along a horizontal direction (as shown in FIG. 3), a vertical direction, or an inclined direction.

Embodiment Eleven

This embodiment further illustrates how the lock is locked on the basis of embodiment two.

As shown in FIGS. 3, 4, and 5, before locking, an end 31 of the steel cable 3 is fixed onto the first lock body 1, and the other end of the steel cable 3 is a free end 32.

As shown in FIGS. 3 and 6, after locking, the free end of steel cable 3 is firmly locked onto the second lock body 2.

The second lock body 2 is provided with a lock core 27. The free end 32 of the steel cable 3 can pass through the lock core 27 in a single direction, i.e., a first direction. As the steel cable 3 passes through the lock core 27, the lock core 27 firmly locks the steel cable 3 in a second direction opposite to the first direction. As such, unlocking would not be possible unless the steel cable 3 is cut off.

The first lock body 1 is provided with a power microswitch 13 for triggering the power supply. The free end 32 of the steel cable 3 can pass through the first lock body 1. The power microswitch 13 is triggered when the steel cable 3 passes through the first lock body 1.

The free end 31 of the steel cable 3 passes through the first lock body 1 and then through the second lock body 2.

The first lock body 1 and the second lock body 2 are both provided with a through hole through which steel cable 3 passes.

The disclosure provides a locator for a cable lock in the technical solution. As such after unlocking, a new disposable RFID component can be assembled with the recyclable locator with a relatively high cost to form a new cable lock, and the locating function can be realized with reduced use cost as much as possible.

The above content is a further detailed description of some embodiments of the disclosure in conjunction with detailed embodiments, and it is not intended to limit the disclosure to these descriptions. For a person having ordinary skills in the art to which the disclosure belongs, various simple deductions or alternations can be made without departing from the concept of the disclosure, all of which should be regarded as falling within the scope of the present disclosure.

The above content is a further detailed description of some embodiments of the disclosure in conjunction with detailed embodiments, and it is not intended to limit the disclosure to these descriptions. For a person having ordinary skills in the art to which the disclosure belongs, various simple deductions or alternations can be made without departing from the concept of the disclosure, all of which should be regarded as falling within the scope of the present disclosure.

What is claimed is:

1. A locator for a cable lock, characterized by comprising a lock body part and a locator, wherein the lock body part is a portion of the cable lock;

wherein the connector is a pogo pin or an electrically conductive plate corresponding to the pogo pin.

2. The locator according to claim 1, wherein a detachable docking structure is arranged on the lock body part.

3. The locator according to claim 2, wherein the detachable docking structure is a T-shaped guide rail.

4. The locator according to claim 2, wherein the detachable docking structure is a T-shaped slider.

5. The locator according to claim 4, wherein an end of the T-shaped slider is provided with a position limit step.

6. The locator according to claim 1, wherein the lock body part is provided with an inner cavity, and the locator is arranged within the inner cavity of the lock body part.

7. The locator according to claim 6, wherein a battery is arranged within the inner cavity.

8. The locator according to claim 7, wherein the battery is electrically connected with the locator.

9. The locator according to claim 1, wherein a connector is arranged on the lock body part.

10. The locator according to claim 9, wherein the connector is electrically connected with the locator.

11. The locator according to claim 1, wherein the lock body part has a through hole through which a metal cable passes through.

12. The locator according to claim 11, wherein the lock body part is provided with a lock core.

13. The locator according to claim 12, wherein the lock core is arranged within the through hole.

14. The locator according to claim 1, wherein the locator is at least one of a GPS device, a Beidou positioning system device, or a Galileo positioning system device.

* * * * *